United States Patent
Takenaka

(10) Patent No.: US 8,928,914 B2
(45) Date of Patent: Jan. 6, 2015

(54) IMAGE PROCESSING APPARATUS, INFORMATION PROCESSING METHOD, AND STORAGE MEDIUM

(75) Inventor: Shuichi Takenaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 13/313,358

(22) Filed: Dec. 7, 2011

(65) Prior Publication Data

US 2012/0162707 A1  Jun. 28, 2012

(30) Foreign Application Priority Data

Dec. 24, 2010  (JP) .................... 2010-287648

(51) Int. Cl.
  *G06F 3/12* (2006.01)
  *G06K 15/02* (2006.01)
(52) U.S. Cl.
  CPC ........ *G06K 15/1822* (2013.01); *G06K 15/1857* (2013.01)
  USPC ........ 358/1.15; 358/1.13; 358/1.16; 358/1.18
(58) Field of Classification Search
  USPC ............... 358/1.13, 1.15, 1.16, 1.18, 1.14
  See application file for complete search history.

(56) References Cited

U.S. PATENT DOCUMENTS

| 6,441,919 B1 * | 8/2002 | Parker et al. ................. 358/1.18 |
| 6,798,534 B1 | 9/2004 | Nishigaki |
| 7,920,281 B2 * | 4/2011 | Ferlitsch ....................... 358/1.15 |
| 8,077,330 B2 * | 12/2011 | Klassen et al. ............... 358/1.13 |
| 8,593,668 B2 * | 11/2013 | Smith ........................... 358/1.15 |
| 2006/0221371 A1 | 10/2006 | Ogasawara |

FOREIGN PATENT DOCUMENTS

| CN | 1506230 A | 6/2004 |
| CN | 1533905 A | 10/2004 |
| CN | 101282408 A | 10/2008 |
| JP | 8-297560 A | 11/1996 |
| JP | 4049203 B1 | 2/2008 |
| JP | 2009-172913 A | 8/2009 |

* cited by examiner

*Primary Examiner* — Vu B Hang

(74) *Attorney, Agent, or Firm* — Canon USA, Inc., IP Division

(57) ABSTRACT

An image processing apparatus that processes a variable data printing (VDP) job having a plurality of records includes a formation unit configured to form status management data for managing a processing status of a reusable object contained in the VDP job, an assignment unit configured to assign the record of the VDP job to a free CPU core based on the status management data, and a waiting unit configured to wait for the end of processing of all CPU cores that is performing the parallel processing.

8 Claims, 12 Drawing Sheets

FIG.7

| OBJECT | RIP STATUS INFORMATION | RECORD 1 | RECORD 2 | RECORD 3 | RECORD 4 | RECORD 5 |
|---|---|---|---|---|---|---|
| Obj. A | END OF RIP | ○ | ○ | | | ○ |
| Obj. B | BEING PROCESSED | ○ | | ○ | ○ | ○ |
| Obj. C | UNPROCESSED | ○ | ○ | ○ | | ○ |
| Obj. D | UNPROCESSED | | ○ | | | |
| Obj. E | BEING PROCESSED | | | ○ | ○ | ○ |
| Obj. F | UNPROCESSED | | | ○ | ○ | |

SCOPE 1

SCOPE 2

FIG.10

CHECK STATUS

RECEIPT NO.: 5004
STATUS: DURING PRINTING

| | |
|---|---|
| ▫ RECEIPT TIME | ▷ 2010 06/29 15:03 |
| ▫ SECTION ID | ▷ ------- |
| ▫ JOB TYPE | ▷ PRINTER |
| ▫ FILE NAME | ▷ RECORD 2 |
| ▫ USER NAME | ▷ Performance |
| ▫ RECEPTION SIZE | ▷ 4.1 MB |
| ▫ NUMBER OF RASTERIZED PAGES | ▷ 5 |
| ▫ NUMBER OF OUTPUTS | ▷ 5/ 5 |

OK

PRINTER    DURING PRINTING

FIG.11

```
OUTPUT REPORT

REPORT 2        15P
REPORT 3        15P
REPORT 4        16P
REPORT 1        14P
     ⋮
```

FIG.12

|  | OUTPUT PROCESSING INFORMATION | GROUP |
|---|---|---|
| RECORD 1 | PROCESSING END | GROUP A |
| RECORD 2 | BEING PROCESSED | GROUP C |
| RECORD 3 | UNPROCESSED | GROUP B |
| RECORD 4 | UNPROCESSED | GROUP D |
| RECORD 5 | BEING PROCESSED | GROUP A |
| RECORD 6 | PROCESSING END | GROUP C |
| RECORD 7 | BEING PROCESSED | GROUP D |
| RECORD 8 | BEING PROCESSED | GROUP B |

IMAGE PROCESSING APPARATUS, INFORMATION PROCESSING METHOD, AND STORAGE MEDIUM

BACKGROUND OF THE INVENTION

1. Field of the Invention

The present invention relates to an image processing apparatus, an information processing method, and a storage medium.

2. Description of the Related Art

An image processing apparatus is well known (refer to Japanese Patent Application Laid-Open No. 8-297560), which analyzes a page description language (PDL) of print data and divides a job on the unit basis of a page or an object, thereby forming print data. Then, parallel processing for generating a print image is performed with a plurality of raster image processors (RIPs).

A demand for variable data printing (VDP) to print an output result in response to each client is increased. In the VDP, an output which is partly different on the unit basis of a record is printed for each job according to registered client data. The record is a unit of a series of VDP processing. When printing is performed on the unit basis of a client, one record includes print data corresponding to one client.

In the VDP job, variable objects which vary depending on the records are correlated with each other. Further, the variable object is combined to a master object serving as a common background of the records and the resultant object is then printed. If the VDP contains a plurality of the records, the records are managed on the unit basis of a job. This is referred to as a VDP job. Further, an object used in the job at a plurality of times is referred to as a reusable object. The reusable object holds intermediate data or a bit map image that is rasterized once. The reusable object is reused for the second time and thereafter, thereby realizing the speedup of a processing time.

Along with wide use of the VDP, the parallel technique is applied to the VDP job, thereby further increasing the speed of processing of the VDP job.

With a conventional art in Japanese Patent No. 4049203, the speed-up of the VDP job processing is realized by using a plurality of image generation units. Each image generation unit processes all variable objects in the VDP job on the unit basis of a record. When the processing of the variable object data has ended, the data is temporarily stored in an image management unit. A page image generation unit calls the variable object data when generating a raster image in order of the records. The page image generation unit processes the reusable object. According to an exemplary embodiment, a plurality of image generation units is parallel operated. However, one page image generation unit generates a final print image. Therefore, the results are output in order of the records.

With a conventional art in Japanese Patent Application Laid-Open No. 2009-172913, the parallel processing is performed on the unit basis of a record in a plurality of page image generation units to increase the speed and efficiency of the processing of the VDP job. Depending on an output speed and a status of a printer engine, the number of records for parallel processing is varied. In this case, the printer engine can output data at a constant pace, and process the prior record before the record being output. Thus, unnecessary use of a memory or a central processing unit (CPU) is suppressed. In this case, the data is also output in order of the records.

In the parallel processing of the VDP jobs, in a case of page parallel or object parallel processing that is conventionally discussed, data needs to be output in order of pages or records. Therefore, when it takes a long time to process a specific page, a page subsequent to the specific one is not output, a queuing time is generated, and the processing of all VDP jobs takes a long time. On the other hand, weight is laid on obtaining a product on the unit basis of a record in a case of the VDP. If pages in the record are output in correct order, the pages may not be necessarily output in order of the records. A catalogue with an advertisement made in response to client's demand needs to be printed and prepared in advance. However, a client does not come to a shop in order of the records. If the order of pages in a record in a printed matter is correct, the data may not be output in order of the records.

SUMMARY OF THE INVENTION

The present invention is directed to reduce an output time of all VDP jobs.

According to an aspect of the present invention, an image processing apparatus includes a plurality of processors configured to process a variable data printing (VDP) job having a plurality of records. The image processing apparatus includes a first processor configured to process a first record of the VDP job, a second processor configured to process a second record of the VDP job, a control unit configured to control the first processor and the second processor to execute parallel processing, and a print unit configured to print the first record before the second record when the control unit controls the first processor and the second processor to execute the parallel processing and the first processor has ended the processing earlier than the second processor, and print the second record before the first record when the second processor has ended the processing earlier than the first processor.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of the status management table.

FIG. 10 illustrates another example of the report output result (No. 2).

FIG. 11 illustrates another example of the report output result (No. 3).

FIG. 12 illustrates an example of the status management table on the unit basis of a record.

DESCRIPTION OF THE EMBODIMENTS

Various exemplary embodiments, features, and aspects of the invention will be described in detail below with reference to the drawings.

Figure 1:
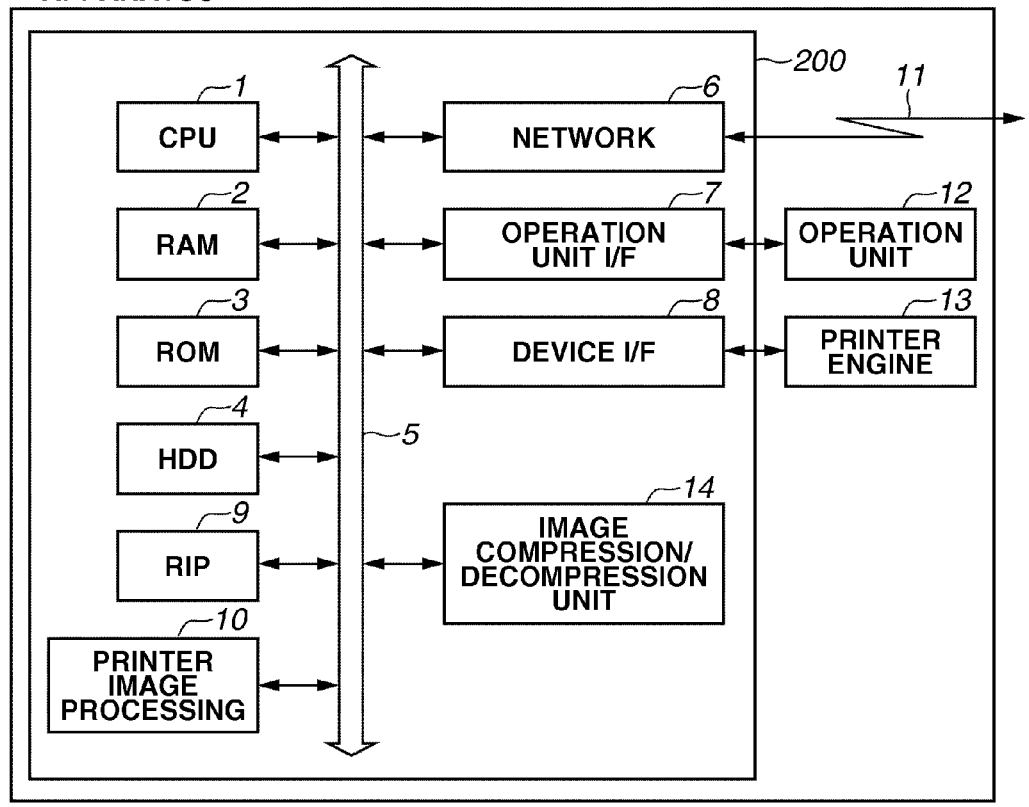
FIG. 1 illustrates an example of a hardware configuration of an image forming apparatus as an example of an image processing apparatus.

FIG. 1 illustrates a hardware configuration of an image forming apparatus as an example of an image processing apparatus. According to a first exemplary embodiment of the present invention, the image forming apparatus is described as a standalone apparatus. However, an information processing apparatus such as a personal computer (PC) or a work station is connected to the image forming apparatus. The VDP job is transferred to the image forming apparatus from the information processing apparatus, mainly via a network or an interface, typically for example, a universal serial bus (USB).

A controller unit 200 controls an input/output of an image signal or device information. A read only memory (ROM) 3 or a hard disk drive (HDD) 4 stores a program describing processing contents according to the present exemplary embodiment and the program is installed to the image forming apparatus.

A central processing unit (CPU) 1 reads the program stored in the ROM 3 or the HDD 4 to a random access memory (RAM) 2 and executes the read program. Further, the CPU 1 comprehensively controls devices connected to a system bus 5. The RAM 2 functions as a main memory or a work memory of the CPU 1.

The ROM 3 stores a boot program that is executed when power is turned on. The HDD 4 stores an operating system (OS) and a main body of a control program. Further, the HDD 4 is used to store data with a large capacity temporarily or for a long time.

A network 6 is connected to a local area network (LAN) 11 to externally input or output print data or device information to/from the image forming apparatus. Further, the program is installed to the ROM 3 or the HDD 4 via the network 6.

An operation unit I/F 7 is an interface with an operation unit 12, and outputs image data to be displayed on the operation unit 12. Further, the operation unit I/F 7 has a function for transmitting information input by a user of the image forming apparatus from the operation unit 12 to the CPU 1. The operation unit 12 includes a liquid crystal panel and a sound source as output devices, and further includes a touch panel, a hard key, and a microphone as input devices.

The controller unit 200 is connected to the printer engine 13 via a device I/F 8. The device I/F 8 transmits an image signal, gives a device operation instruction and receives device information in response to an instruction of the CPU 1. The printer engine 13 is an output device that outputs the image signal from the controller unit 200 onto a medium, and may be any of an electrophotographic type or an inkjet type.

A raster image processing (RIP) 9 is dedicated hardware that rasterizes intermediate print data to a raster image. The RIP 9 processes intermediate print data generated on the RAM 2 by the CPU 1 at high speed in parallel with execution by the CPU 1. A printer image processing unit 10 performs image correction and halftone processing of print output image data. An image compression/decompression unit 14 compresses or decompresses the image data.

Portions other than the printer engine 13 in the image forming apparatus may be a hardware circuit such as an application specific integrated circuit (ASIC), like the RIP 9. On the other hand, a part of a hardware circuit or all thereof may be realized by software.

A disk drive for a mobile disk recording medium such as a compact disk (CD) or a digital versatile disc (DVD), or a memory reader/writer for a mobile nonvolatile recording medium such as a flash memory may be connected to the system bus 5. Further, the program describing the processing according to the present exemplary embodiment can be stored in the ROM 3 or the HDD 4 via the mobile storage medium. Then, the program can be installed to the image forming apparatus.

The CPU 1 is a multiprocessor system having a plurality of processors as hardware to realize the parallel processing. Further, a plurality of processor cores may be provided as a microprocessor. Alternatively, the CPU 1 may use a technique of regarding a plurality of processors as one processor by effectively utilizing a free time of a register or a pipeline within a processor such as a hyper-threading. Alternatively, a large number of processing may be separated and executed on a host computer connected via the network. The image forming apparatus according to the present exemplary embodiment uses a plurality of processors as a page image generation unit, and assigns information record (hereinafter, simply referred to as a record) as a unit of processing.

The CPU 1 executes processing based on the program stored in the HDD 4, thereby realizing processing of a software module configuration and a flowchart.

Figure 2:
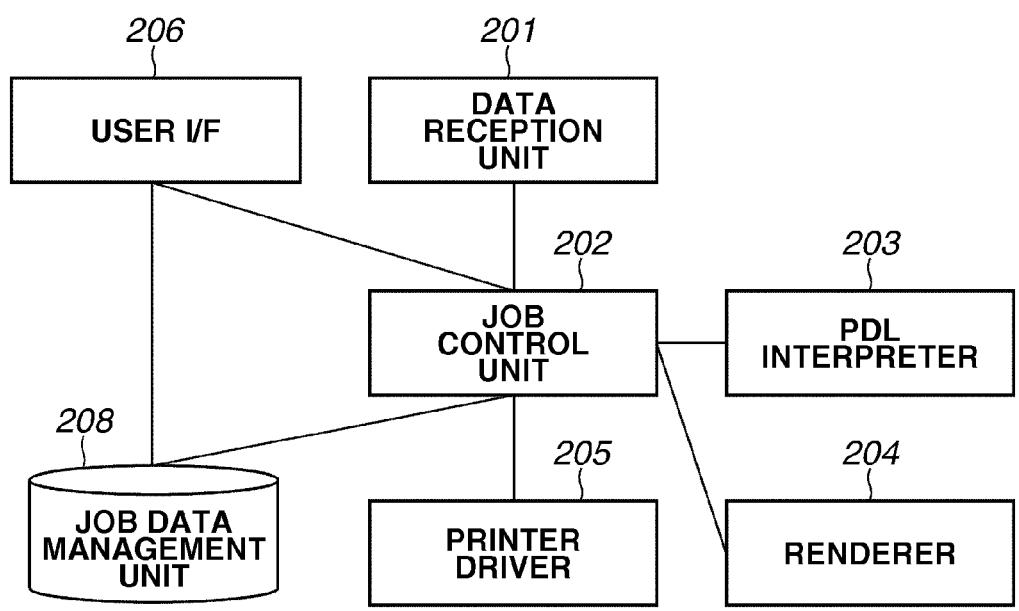
FIG. 2 illustrates an example of a software module in the image forming apparatus.

FIG. 2 illustrates an example of a software module of the image forming apparatus.

A data reception unit 201 receives the print data transmitted from the host computer. A job data management unit 208 stores the received data via a job control unit 202. The job control unit 202 performs the entire control from data reception until printing. A page description language (PDL) interpreter 203 interprets the print data, and generates a display list as intermediate data. The job data management unit 208 stores the generated display list via the job control unit 202. A renderer 204 is a module that generates a bit map image from the display list. The RIP 9 is dedicated hardware which executes a large number of processing. The job data management unit 208 stores the generated bit map image via the job control unit 202. A printer driver 205 instructs the printer engine 13 to make prints and transmits the bit map image via the device I/F 8.

A user interface 206 is a module that controls the operation unit 12 via the operation unit I/F 7. The user interface 206 mainly generates data displayed on the liquid crystal panel of the operation unit 12, and updates the display of the liquid crystal panel according to an input from the touch panel. Further, when an input from the touch panel instructs a job execution, the user interface 206 transmits the instruction to the job control unit 202.

The job data management unit 208 is a database that stores and manages the print data, the display list, and the bit map image temporarily or for a long term. According to the present exemplary embodiment, a plurality of the PDL interpreters 203 and a plurality of the renderers 204 are provided, thereby realizing the parallel processing.

Figure 3:
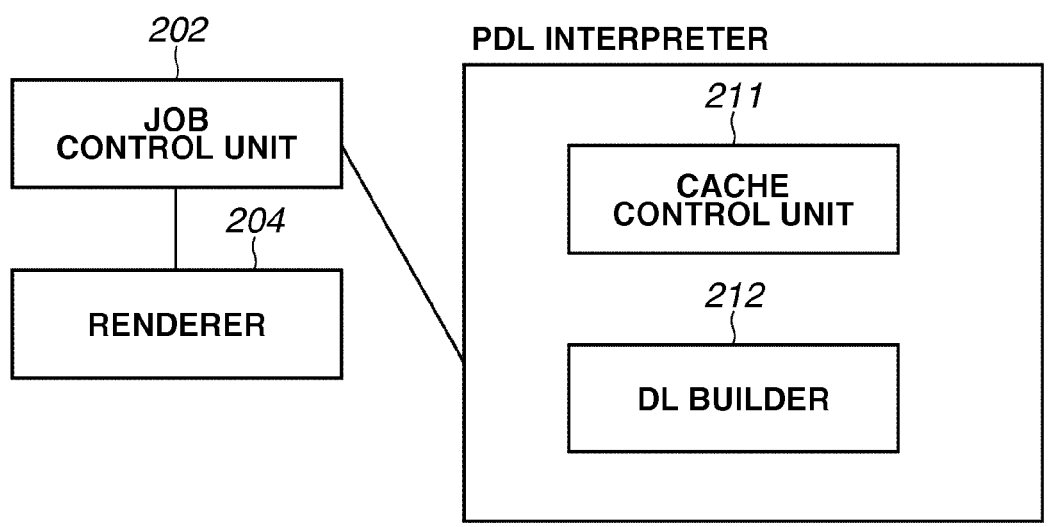
FIG. 3 illustrates an example of a software module configuration describing a page description language (PDL) interpreter in more detail than in FIG. 1.

FIG. 3 illustrates an example of a specific software module of the PDL interpreter 203 in FIG. 1.

The PDL interpreter 203 interprets the VDP job. A description language (DL) builder 212 outputs the display list as the intermediate data. A cache control unit 211 caches a drawing object in a bit map image format or a display list format.

When the VDP job instructs the reuse of the drawing object, the PDL interpreter 203 reuses the drawing object with the cache control unit 211.

Figure 4:
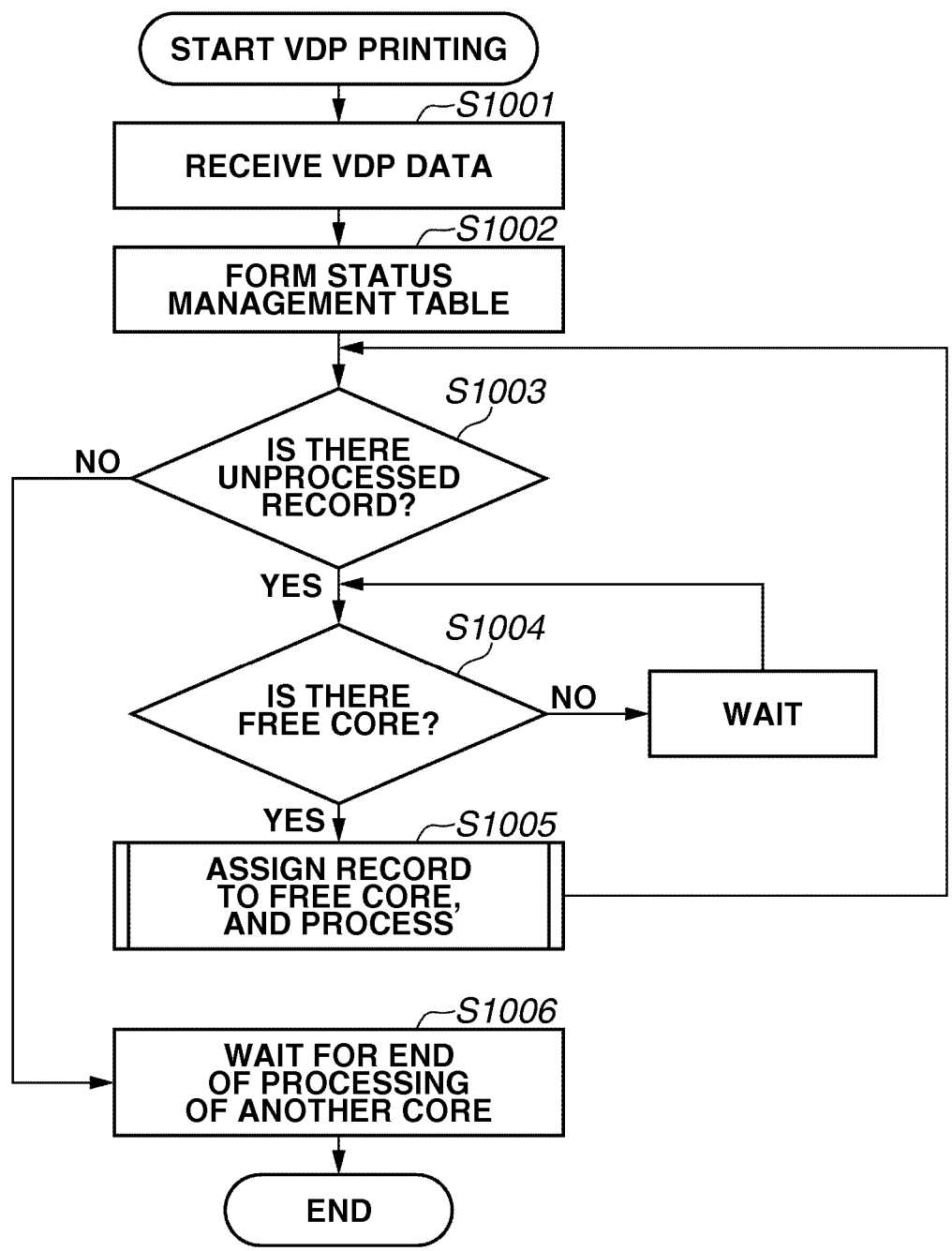
FIG. 4 illustrates a flowchart of an example of variable data printing (VDP) processing.

The outline of the VDP processing is described with reference to a flowchart in FIG. 4. FIG. 4 illustrates a flowchart of an example of the VDP processing.

In step S1001, the data reception unit 201 receives the VDP job transmitted via the network 6 from the information processing apparatus, and informs the job control unit 202 of a job input. The job control unit 202 spools the received VDP job to the job data management unit 208.

In step S1002, the job control unit 202 instructs the PDL interpreter 203 to form a status management table of the reusable object contained in the VDP job. The status management table is an example of status management data. The PDL interpreter 203 interprets the VDP job and forms the status management table of the reusable object, and proceeds to step S1003.

In step S1003, the job control unit 202 instructs the PDL interpreter 203 to determine whether the VDP job includes an unprocessed record. If the VDP job includes the unprocessed record (YES in step S1003), the job control unit 202 proceeds to step S1004.

In step S1004, the job control unit 202 determines whether there is a free CPU core (hereinafter, simply referred to as a core). If there is not a free core (NO in step S1004), the job control unit 202 waits until the core is free. If there is a free core (YES in step S1004), the job control unit 202 proceeds to step S1005.

In step S1005, the job control unit 202 performs distribution processing for assigning the record to the free core. After ending the distribution processing, the job control unit 202 advances to step S1003. If the VDP job does not include an unprocessed record (NO in step S1003), the job control unit 202 proceeds to step S1006.

In step S1006, the job control unit 202 waits until end of the processing of all cores that is performing the parallel processing. The job control unit 202 confirms that all cores have ended the processing, and ends the VDP processing.

Figure 5:
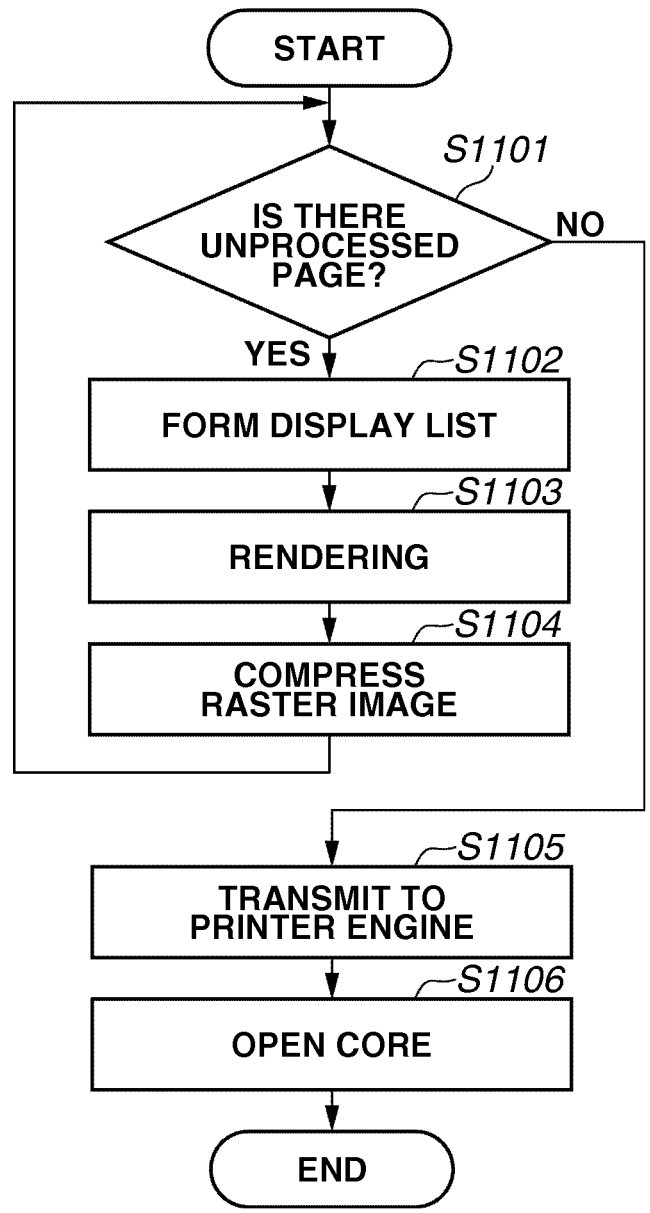
FIG. 5 illustrates a flowchart of an example of page image generation processing.

A description will be given of image generation processing of a page subjected to the parallel processing in the core with reference to a flowchart in FIG. 5. FIG. 5 illustrates an example of the page image generation processing.

The corresponding record is distributed from the job control unit 202. In step S1101, the PDL interpreter 203 determines whether there is an unprocessed page. If there is an unprocessed page (YES in step S1101), the PDL interpreter 203 proceeds to step S1102. In step S1102, the job control unit 202 instructs the PDL interpreter 203 to generate the display list. The PDL interpreter 203 generates the display list as the intermediate data. The job control unit 202 temporarily stores the generated display list in the job data management unit 208.

In step S1103, the job control unit 202 instructs the renderer 204 to make a bit map of the display list. The renderer 204 makes the bit map image of the display list with the RIP 9. In step S1104, the job control unit 202 compresses the generated bit map image with the image compression unit 14. Further, the job data management unit 208 deletes the bit map image from a management target. The job control unit 202 returns the processing to step S1101. If there is not an unprocessed page (NO in step S1101), the PDL interpreter 203 proceeds to step S1105.

In step S1105, the job control unit 202 instructs the printer driver 205 to transmit the bit map image to the printer engine 13. The printer driver 205 transmits the bit map image in synchronization with the printer engine 13. Further, the printer driver 205 performs decompression processing of the bit map image with the image compression unit 14 before the transmission. The printer driver 205 deletes the bit map image whose transmission to the printer engine 13 has ended, from the job data management unit 208.

In step S1106, the printer driver 205 opens the core, and informs the job control unit 202 of the opening of the core. According to the present exemplary embodiment, the processing in the flowchart in FIG. 4 is processed in parallel depending on the number of the CPU cores.

A specific description will be given of formation processing of the status management table of the reusable object in step S1002 in the VDP processing. The VDP job includes layout information of a page. The layout information includes data information on the reusable object/variable object. The layout information describes which record includes which object. The PDL interpreter 203 forms the status management table of the reusable object based on the layout information.

Figure 6:
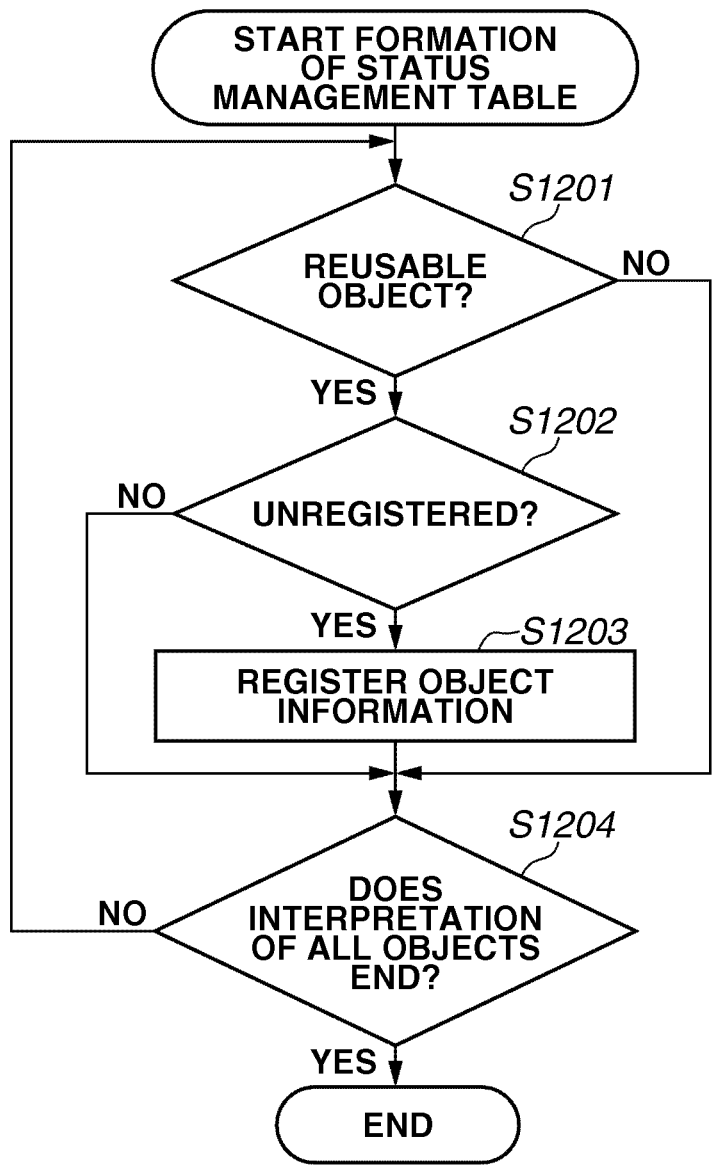
FIG. 6 illustrates a flowchart of formation processing of a status management table.

FIG. 6 illustrates a flowchart of the formation processing of the status management table.

In step S1201, when the VDP job includes an instruction to draw the object, the PDL interpreter 203 determines whether the object data is the reusable object. If the object data is not the reusable object, i.e., image data which is not used (NO in step S1201), the PDL interpreter 203 proceeds to step S1204. If the object data is the reusable object (YES in step S1201), the PDL interpreter 203 proceeds to step S1202.

In step S1202, the PDL interpreter 203 determines whether the object data has already been registered in the status management table by referring to the formed status management table. If the object data is unregistered (YES in step S1202), the PDL interpreter 203 proceeds to step S1203. In step S1203, the PDL interpreter 203 executes processing for registering information on the reusable object in the status management table. In step S1204, the PDL interpreter 203 determines whether the interpretation of all object has ended. If the interpretation of all objects has not ended (NO in step S1204), the PDL interpreter 203 returns to step S1201 and the processing continues.

FIG. 7 illustrates an example of the status management table. Information stored in the status management table contains an RIP status (RIP unprocessed, RIP processed, or end of RIP) (status information indicating a processing status) of each object, an existing record range (range information), and an object attribute (e.g., scope attribute).

A description will be given of the corresponding record distribution processing in step S1005 in the VDP processing. The job control unit 202 distributes the VDP job processing per record based on the information of the object status management table. When the distribution processing starts, the job control unit 202 refers to the object information in the object status management table to determine the record to be distributed. The job control unit 202 refers to the record having the object. Further, the job control unit 202 compares the record with another record being parallel-processed, and selects the record with high independence.

A description will be given of specific record distribution processing according to the present exemplary embodiment with reference to FIG. 7. Referring to FIG. 7, a record 1 includes objects A, B, and C. Further, a record 2 includes objects A, C, and D. Furthermore, a record 3 includes objects B, C, E, and F. In addition, a record 4 includes objects B, E, and F. In addition, a record 5 includes objects A, B, C, and E.

According to the present exemplary embodiment, it is determined that the record which shares an object with another, and which shows the smallest number of the RIP-unprocessed or reusable objects being RIP-processed, is a highly dependent record. When the record 1 is parallel processed, the records 2 and 4 are determined to be highly independent because the records 2 and 4 have a smaller number (one) of the RIP-unprocessed or RIP-processed shared objects than that of the record 1. Thus, when the records are determined to be at the same level of high independence, according to the present exemplary embodiment, the job control unit 202 selects a record which shares a smaller number of the objects, irrespective of the RIP status of the reusable object. Therefore, the job control unit 202 selects the record 4 as a parallel processing record, and distributes the selected record 4 to the PDL interpreter 203. Accordingly, the occurrence of a waiting status or reoccurrence of RIP processing is suppressed by a plurality of the record parallel processing which simultaneously refers to one reusable object.

Figure 8:
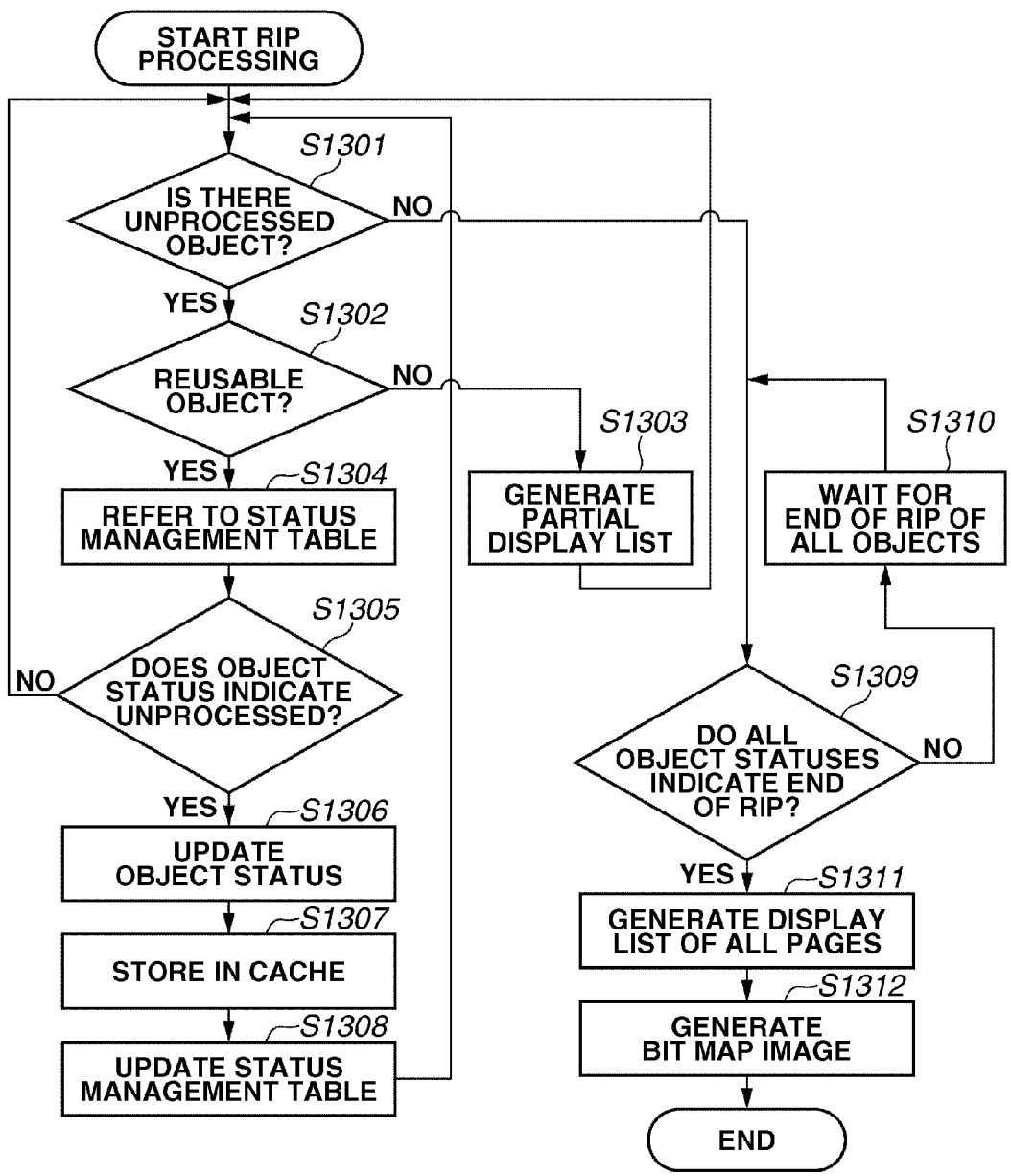
FIG. 8 illustrates a flowchart of an example of raster image processor (RIP) processing.

A description will be given of the RIP processing in steps S1102 to S1103 in the page image generation processing that is parallel-processed by the core with reference to FIG. 8. FIG. 8 illustrates a flowchart of an example of the RIP processing.

In step S1301, the PDL interpreter 203 determines whether the VDP job includes an instruction to draw an unprocessed object. If the VDP job includes the unprocessed objects (YES in step S1301), the PDL interpreter 203 proceeds to step S1302. In step S1302, the PDL interpreter 203 determines whether the object data is the reusable object. If the object data is not the reusable object, that is, the image data that is not reused (NO in step S1302), the PDL interpreter 203 proceeds to step S1303. In step S1303, the PDL interpreter 203 interprets the instruction to draw the object data, and executes processing for generating a partial display list.

If the object data is the reusable object (YES in step S1302), the PDL interpreter 203 proceeds to step S1304. In step S1304, the PDL interpreter 203 refers to the status management table of the reusable object to obtain RIP status information of the reusable object. If the RIP status of the reusable object indicates "RIP unprocessed", the PDL interpreter 203 proceeds to step S1305.

In step S1305, the PDL interpreter 203 updates the RIP status information in the status management table of the reusable object from "RIP unprocessed" to "RIP processed".

In step S1306, similarly to step S1303, the PDL interpreter 203 executes processing for generating the partial display list. The partial display list is generated on the unit basis of an object differently from the display list generated on the unit basis of a page.

In step S1307, the PDL interpreter 203 stores the partial display list generated in step S1306 in a cache. The storage destination is a cache memory or the HDD 4 depending on a use situation of the cache memory. In step S1308, the PDL interpreter 203 updates the RIP status information on the status management table of the objects, from the "RIP processed" to the "end of RIP". Then, the PDL interpreter 203 returns to step S1301. If the RIP status information of the objects indicates the "RIP being processed" or the "end of RIP" (NO in step S1305), the PDL interpreter 203 returns also to step S1301. With the processing, the partial display lists corresponding to all pages included in the record are generated. If there is not the unprocessed record in the record (NO in step S1301), the PDL interpreter 203 proceeds to step S1309.

In step S1309, the PDL interpreter 203 determines whether there is an object being the RIP-processed in the corresponding record. If there is the object being RIP-processed in the corresponding record (NO in step S1309), the PDL interpreter 203 proceeds to step S1310. In step S1310, the PDL interpreter 203 waits for end of RIP of the objects which is performed in another processing. If there is not an object being the RIP-processed in the corresponding record (YES in step S1309), the PDL interpreter 203 proceeds to step S1311 and the PDL interpreter 203 or the cache control unit 211 generates all display lists contained in all pages of the record. In step S1312, the renderer 204 generates the bit map image from the display list contained in the record.

The RIP processing is parallel performed depending on the number of CPU cores. As a consequence, the page image generation can be parallel processed on the unit basis of a record. Further, it is possible to suppress double RIP processing and the RIP waiting status of the object shared by a plurality of records.

Figure 9:
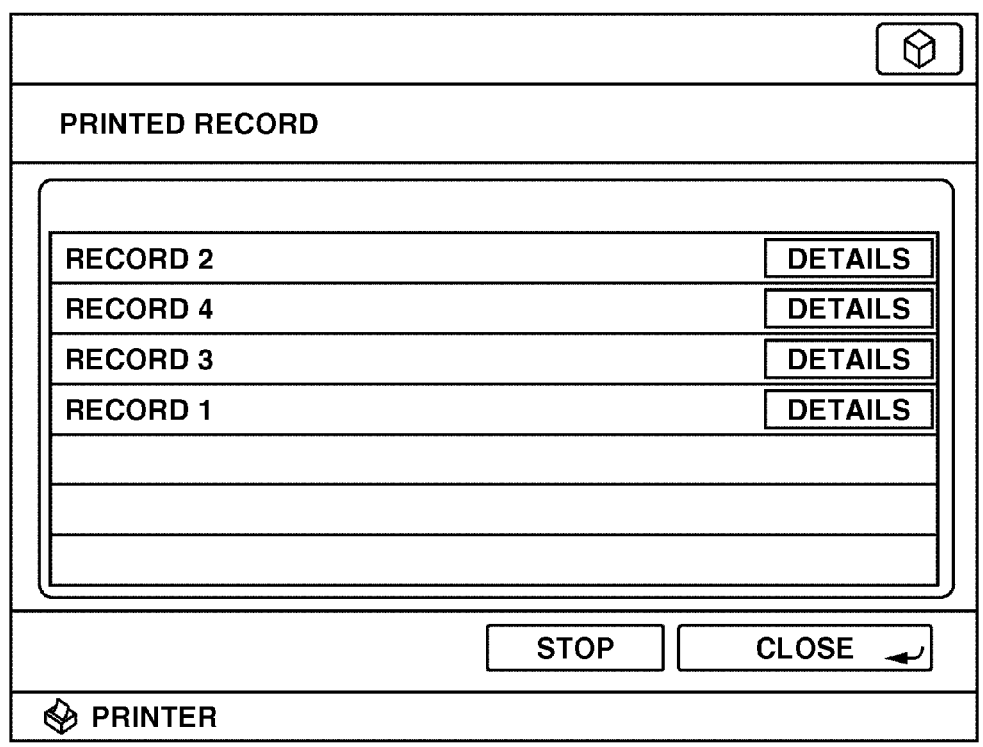
FIG. 9 illustrates an example of a report output result (No. 1).

According to the present exemplary embodiment, data is sequentially transmitted to the printer engine 13 via the device I/F 8 as to the record in which the image generation of all pages has ended in the page image generation unit. The printer engine 13 generates a printed matter based on the transmitted data, and outputs the printed matter. In this case, the order of records becomes random, and it is difficult to inspect whether the output result is as expected. Therefore, the job control unit 202 outputs a report informing a status of the output (printed) record at an arbitrary interval, thereby supporting the inspection of a user. The record may be output every time when a constant number of records has been output. Alternatively, the user may arbitrarily determine the output interval of record at a time of inputting the VDP job. The output interval can be also changed during processing of the VDP job. Further, the report may be output to a sheet or a user interface (UI). FIGS. 9 to 11 illustrate examples of an output result of the report.

According to the first exemplary embodiment, the processing on the unit basis of a record is parallel performed. Therefore, the job control unit 202 refers to the status management table to determine the record for the next processing every time the RIP processing of one record ends. However, there can be a VDP job having a large amount of records, e.g., 10000 records or more in a print-on-demand (POD) market. In the processing of such VDP job, it is inefficient that the job control unit 202 every time performs the RIP processing on the unit basis of a record and distribution processing for determining the record for the next record.

According to the present second exemplary embodiment, in order to reduce the distribution processing of the job control unit 202, a plurality of records is grouped and the records are subjected to the parallel processing on the unit basis of a group. In this case, at a time of the distribution processing of the corresponding record in the VDP processing, a plurality of records is grouped. The job control unit 202 divides the records contained in the VDP job into groups corresponding to the number of the parallel processing, i.e., the number of cores. If four cores can be parallel processed and the VDP job contains 10000 records, the job control unit 202 divides the records into four groups each having 2500 records, distributes the divided records into the cores, and performs the parallel processing. In the grouping, the job control unit 202 focuses on the scope attribute of the object in the status management table of the objects. The job control unit 202 groups the records having a large number of objects with the scope attribute of the same record set, and increases the independency of the reusable object between the groups.

According to the present exemplary embodiment, the job control unit 202 forms the status management table also on the unit basis of a record. The status management table on the unit basis of a record has output processing information (processing ended, being processed, or unprocessed) of the record and information as which group the record belongs to, as illustrated FIG. 12. The core updates the record when processing the corresponding record. When the processing of the corresponding group has ended, the job control unit 202 refers to the status management table on the unit basis of a record. The job control unit 202 determines the group having the greatest number of the unprocessed record from the information, assigns a free core to the group, and performs the parallel processing.

According to the present exemplary embodiment, the parallel unit is shifted from a group unit to a record unit according to the processing situation, thereby improving the parallel performance.

In the parallel processing of the record, the job control unit 202 determines the record for the parallel processing. However, it is preferable to process the records in order of records when the type of a print sheet is different depending on the record unit. Such a VDP job does not bring much advantage which is described above. However, it is possible that a part of records can be processed in the order of records and the remaining records can be processed in random order of records. In this case, the image forming apparatus performs the processing by switching a mode between the record order and the random order prioritizing output speed.

In this case, at a time of inputting the VDP job to the image forming apparatus from the information processing apparatus, the user designates an area prioritizing the record order on the unit basis of a record. When the image forming apparatus receives the VDP job, the job control unit 202 divides the VDP job into a part prioritizing the record order and a random order part prioritizing the output speed. When the random order part prioritizing the output speed is processed before the part prioritizing the record order, even if it takes a long time to process one page or one object, from the record which can be first output, output is carried out. When the reusable object that takes a long time for processing is used for the part prioritizing the record order, the RIP processing has ended. Therefore, the processing is finished earlier than when the part prioritizing the record order is first processed.

According to the present exemplary embodiment, the random order part prioritizing the output speed is subjected to the parallel RIP processing before the part prioritizing the record order. Then, the part prioritizing the record order can be RIP processed.

The VDP job is processed at high speed by switching the record order and the random order.

According to the exemplary embodiments, in the parallel processing of the VDP job, even if it takes a long time to process a specific page, another record whose processing has ended can be output. Accordingly, the output time of all VDP jobs is reduced.

According to the present invention, the image processing apparatus that processes the VDP job having a plurality of records includes a formation unit configured to form status management data for managing a processing status of a reusable object contained in the VDP job, an assignment unit configured to assign the record of the VDP job to a free CPU core based on the status management data, and a waiting unit configured to wait for the end of processing of all CPU cores which are performing parallel processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-287648 filed Dec. 24, 2010, which is hereby incorporated by reference herein in its entirety.

What is claimed is:

1. An image processing apparatus including a plurality of processors configured to process a variable data printing (VDP) job having a plurality of records, the image processing apparatus comprising:
a first processor configured to process a first record of the VDP job received from a first client to generate first bit map images of all pages for the first record;
a second processor configured to process a second record of the VDP job received from a second client to generate second bit map images of all pages for the second record;
a control unit configured to control the first processor and the second processor to execute parallel processing; and
a print unit configured to print the first bit map images before the second bit map images when the control unit controls the first processor and the second processor to execute the parallel processing and the first processor has ended the processing earlier than the second processor, and to print the second bit map images before the first bit map image when the second processor has ended the processing earlier than the first processor.

2. The image processing apparatus according to claim 1, further comprising:
a formation unit configured to form status management data for managing a processing status of a reusable object contained in the VDP job; and
an assignment unit configured to assign processing of one of the records to a waiting processor based on the status management data,
wherein the status management data includes RIP status information indicating whether RIP is unprocessed, RIP is being processed, or RIP processing has ended, and range information indicating a range of the record having the reusable object, and
wherein the assignment unit assigns to the waiting processor one of the records of the VDP job having the smallest number of the reusable objects that are RIP unprocessed or undergoing the RIP processing, and are shared by another record, based on the status management data.

3. The image processing apparatus according to claim 1, wherein the assignment unit groups a number of the reusable objects contained in the VDP job, corresponding to a number of processors, and assigns a group having the greatest number of the records that are unprocessed, to a waiting processor.

4. The image processing apparatus according to claim 3, wherein the status management data includes an attribute of the reusable object, and
wherein the assignment unit groups the reusable object contained in the VDP job based on the attribute.

5. The image processing apparatus according to claim 1, wherein, when the VDP job is divided into a part prioritizing a record order and a random order part prioritizing output speed on the unit basis of a record, the assignment unit assigns to a waiting processor the random order part of the VDP job prioritizing output speed before the part prioritizing the record order, based on the status management data to execute parallel RIP processing, and then assigns the part prioritizing the record order to the processor to execute the RIP processing.

6. The image processing apparatus according to claim 1, further comprising:
an output unit configured to output a report informing a user of a status of the record printed by the print unit.

7. An information processing method of an image processing apparatus that processes a variable data printing (VDP) job having a plurality of records, the information processing method comprising the steps of:
first processing of a first record of the VDP job received from a first client to generate first bit map images of all pages for the first record;
second processing of a second record of the VDP job received from a second client to generate second bit map images of all pages for the second record;
performing control to parallel execute the first processing and the second processing; and
printing the first bit map images before the second bit map images when the first processing and the second processing are parallel executed, and the first processing has ended earlier than the second processing, and printing the second bit map images before the first bit map images when the second processing has ended earlier than the first processing,
wherein the steps are executed by a processor.

8. A non-transitory computer-readable storage medium storing computer-executable instructions which when executed by a computer cause the computer to perform an information processing method for processing a variable data printing (VDP) job having a plurality of records, the information processing method comprising:
first processing of a first record of the VDP received from a first client job to generate first bit map images of all pages for the first record;
second processing of a second record of the VDP job received from a second client to generate second bit map images of all pages for the second record;
performing control to parallel execute the first processing and the second processing to generate second bit map images of all pages for the second record; and
printing the first bit map images before the second bit map images when the first processing and the second processing are parallel executed and the first processing has ended earlier than the second processing, and printing the second bit map images before the first bit map images when the second processing has ended earlier than the first processing.

* * * * *